US008913022B2

(12) United States Patent
Okabayashi (10) Patent No.: US 8,913,022 B2
(45) Date of Patent: Dec. 16, 2014

(54) CHARACTER INPUT DEVICE, IMAGE FORMING APPARATUS INCLUDING THE SAME, AND METHOD FOR CONTROLLING THE CHARACTER INPUT DEVICE

(75) Inventor: Yoshifumi Okabayashi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 163 days.

(21) Appl. No.: 13/557,301

(22) Filed: Jul. 25, 2012

(65) Prior Publication Data

US 2013/0027312 A1 Jan. 31, 2013

(30) Foreign Application Priority Data

Jul. 26, 2011 (JP) ................................. 2011-162992

(51) Int. Cl.
*G06F 3/048* (2013.01)
*G06F 3/023* (2006.01)
*G06F 3/0488* (2013.01)

(52) U.S. Cl.
CPC .......... *G06F 3/0237* (2013.01); *G06F 3/04886* (2013.01)
USPC ......................................... 345/173

(58) Field of Classification Search
CPC .................................................. G06F 3/0237
USPC ............ 341/23; 345/156, 168, 169, 173, 179; 382/230; 710/200; 713/100; 715/256, 715/765; 717/178; 358/1.16; 340/426.35
See application file for complete search history.

(56) References Cited

U.S. PATENT DOCUMENTS

| | | | |
|---|---|---|---|
| 2010/0060585 A1* | 3/2010 | Chiu | ............................ 345/168 |
| 2011/0063668 A1 | 3/2011 | Shirai | |
| 2011/0235122 A1* | 9/2011 | McCann | ...................... 358/1.16 |

FOREIGN PATENT DOCUMENTS

| | | | |
|---|---|---|---|
| JP | 63-278139 A | 11/1988 | |
| JP | 11-133816 | 5/1999 | |
| JP | 2011-65368 A | 3/2011 | |

* cited by examiner

*Primary Examiner* — Dwayne Bost
*Assistant Examiner* — Sepehr Azari
(74) *Attorney, Agent, or Firm* — Morgan, Lewis & Bockius LLP (57) ABSTRACT

Provided is a character input device that can improve user's convenience (can reduce operations to be performed by the user). In this character input device, an operation display portion displays a keyboard screen corresponding to a character type of the first character of the registered user information as an initial screen for accepting re-input, when accepting the re-input of the same user information as the registered user information.

9 Claims, 9 Drawing Sheets

CHARACTER INPUT DEVICE, IMAGE FORMING APPARATUS INCLUDING THE SAME, AND METHOD FOR CONTROLLING THE CHARACTER INPUT DEVICE

This application is based upon and claims the benefit of priority from the corresponding Japanese Patent Application No. 2011-162992 filed on Jul. 26, 2011, the entire contents of which are incorporated herein by reference.

BACKGROUND OF THE DISCLOSURE

1. Field of the Disclosure

The present disclosure relates to a character input device, an image forming apparatus including the same, and a method for controlling the character input device.

2. Description of Related Art

Conventionally, there is known a character input device capable of inputting various types of characters. Such a character input device is mounted in an image forming apparatus, for example. Note that the character input device mounted in the image forming apparatus is called an operation panel (or an operation portion).

Conventionally, a keyboard screen (a screen with software keyboard) is displayed on the operation panel for accepting a character input from a user. Thus, the user can input characters using the software keyboard. In addition, conventionally, instead of simply displaying a general keyboard screen on the operation panel, a keyboard screen for inputting alphabets is displayed as an initial screen for accepting alphabet input from the user, or a keyboard screen for inputting numerals is displayed as the initial screen for accepting numeral input from the user. In other words, conventionally, a type of keyboard screen to be displayed as the initial screen for accepting character input (a type of characters that can be input) is set in advance.

Here, there is a case where the image forming apparatus requests the user to re-input the same user information as that already registered. The user information means information defined by a character string including alphabets, numerals, and the like. For instance, as an example of the user information, there is a user name or the like. A user may register the user name as a character string consisting of only alphabets, and another user may register the user name as a character string consisting of only numerals. In such cases, when a type of the keyboard screen to be displayed as the initial screen for accepting input of the user information (a type of characters that can be input) is set in advance, the following inconvenience may occur.

For instance, it is supposed that the keyboard screen for inputting alphabets is displayed as the initial screen for accepting input of the user name. In this case, the user who has registered the user name as a character string consisting of only alphabets can re-input the user name using the keyboard screen for inputting alphabets as it is, which is displayed as the initial screen. In contrast, the user who has registered the user name as a character string consisting of only numerals cannot re-input the user name unless switching the keyboard screen for inputting alphabets to the keyboard screen for inputting numerals. In other words, for the user who has registered the user name as a character string consisting of only numerals, it is not convenient that he or she has to perform an additional operation (of switching the displayed keyboard screen) for re-inputting the user name.

SUMMARY OF THE DISCLOSURE

The present disclosure is made for solving the above-mentioned problem, and it is an object thereof to provide a character input device, an image forming apparatus including the same, and a method for controlling the character input device, which can improve user's convenience (can reduce operations to be performed by the user).

A character input device of the present disclosure includes an operation display portion that selectively display one of a plurality of keyboard screens for inputting different character types so as to accept input of a character string indicating user information, and a storage portion that stores screen information for displaying the plurality of keyboard screens and stores the user information accepted by the operation display portion. Further, when accepting re-input of user information that is the same as registered user information that is already stored in the storage portion, the operation display portion displays a keyboard screen corresponding to a character type of a first character of the registered user information as an initial screen for accepting the re-input.

According to the present disclosure, it is possible to improve user's convenience (can reduce operations to be performed by the user).

Further features and advantages of the present invention will become apparent from the description of embodiments given below.

DETAILED DESCRIPTION OF PREFERRED EMBODIMENTS

Hereinafter, with reference to FIG. 1, an image forming apparatus 100 of an embodiment of the present disclosure is described.

The image forming apparatus 100 of this embodiment is a tandem type color multifunction peripheral, which can perform a plurality of types of jobs such as copy, print, scanner, and facsimile. In addition, the image forming apparatus 100 also has a function of allowing only a logged-in user to use the apparatus (or use a specific function). For instance, a user undergoes user authentication for login when using the image forming apparatus 100. Then, the logged-in user is allowed to use the image forming apparatus 100 within the given authority. Note that the user authentication for login will be described later in detail.

As a structure of this image forming apparatus 100, it includes an operation panel 101, an image reading portion 102, and an engine portion (a paper sheet feeder 103, a transport path 104, an image forming portion 105, an intermediate transfer portion 106, a fixing portion 107, and a double-sided transport path 108), and the like.

Figure 1:
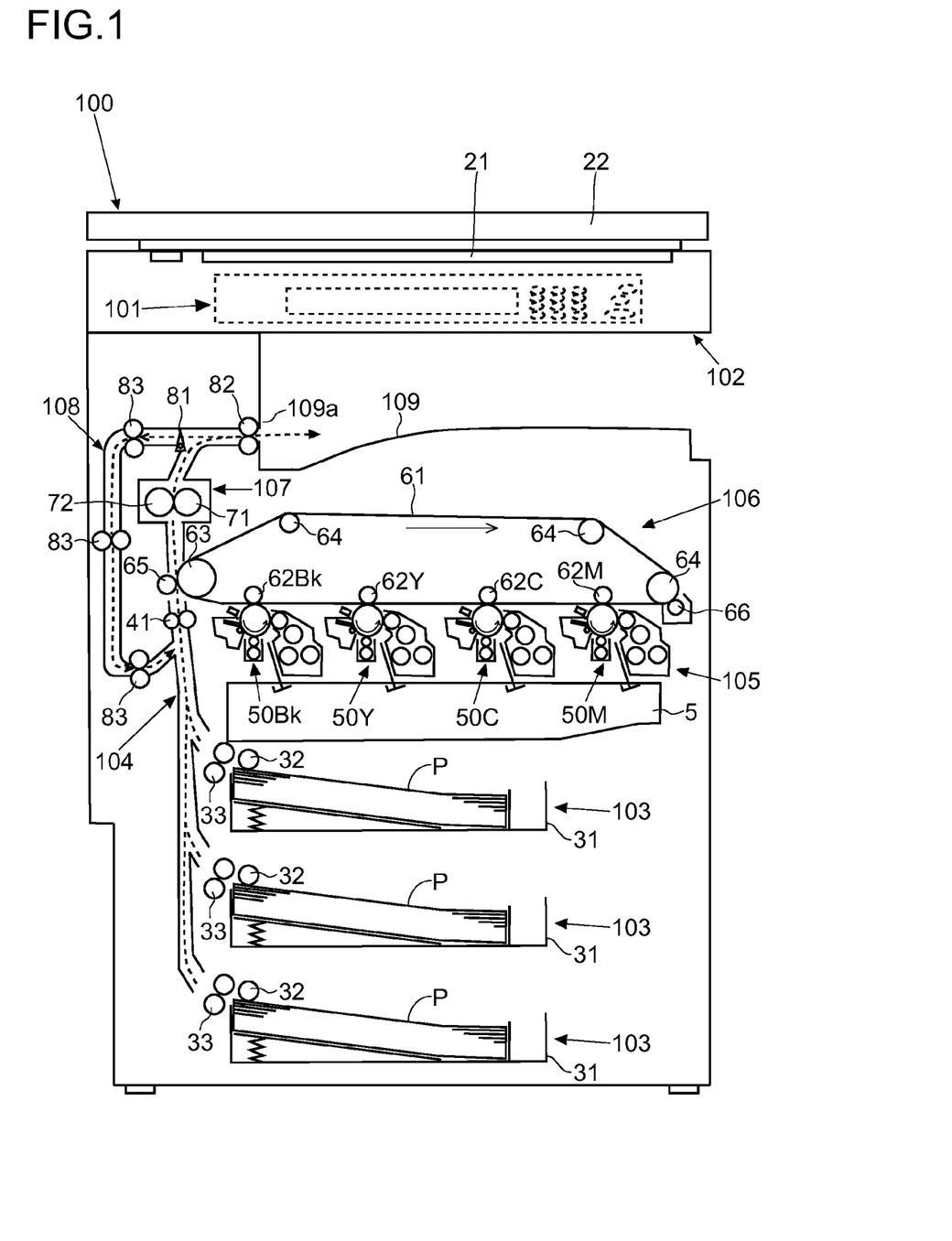
FIG. 1 is a schematic diagram of an image forming apparatus including an operation panel (character input device) according to an embodiment of the present disclosure.
Figure 2:
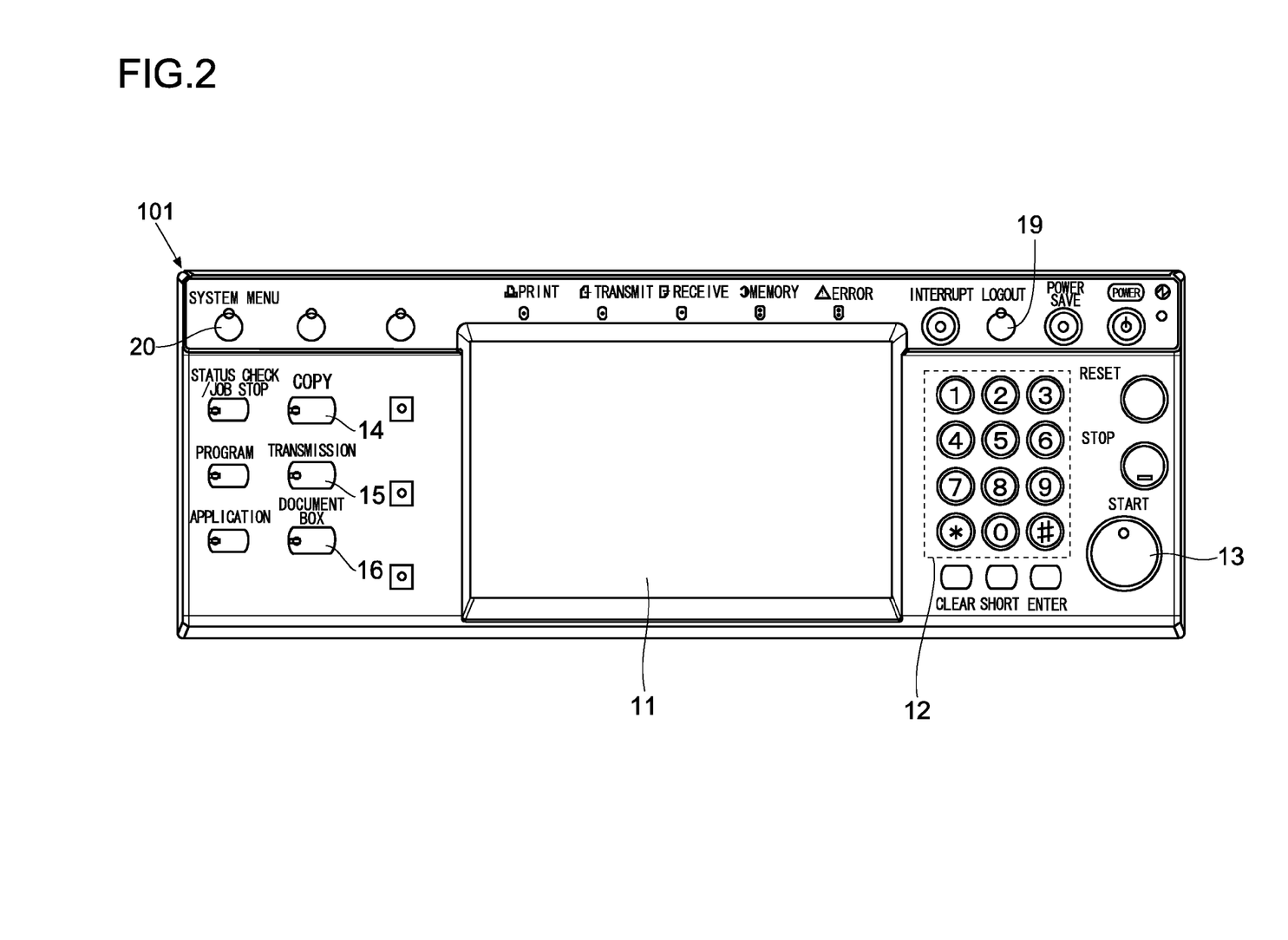
FIG. 2 is a plan view of the operation panel (character input device) according to an embodiment of the present disclosure.

The operation panel 101 corresponds to a character input device and is disposed in the portion illustrated with a broken line in FIG. 1. As illustrated in FIG. 2, the operation panel 101 includes a liquid crystal display portion 11 as the operation display portion. The liquid crystal display portion 11 displays menus and setting keys (software keys) for various settings and also displays messages indicating a state of the apparatus. Then, the user can perform various settings or the like by pressing the setting keys displayed on the liquid crystal display portion 11. Note that the liquid crystal display portion 11 has a structure with a touch panel covering the surface of the display. Thus, when the setting key displayed on the liquid crystal display portion 11 is pressed by the user (when the touch panel is pressed), coordinates of the pressed position can be detected based on an output of the touch panel.

In addition, the operation panel 101 is equipped with hardware keys including a ten-key 12, a start key 13, and the like. The ten-key 12 is a hardware key for accepting setting instructions requiring numeric input from the user. The start key 13 is a hardware key for accepting an instruction to start execution of various jobs from the user.

Further, the operation panel 101 includes hardware keys such as a copy key 14, a transmission key 15, and a box key 16. Then, when the copy key 14 is pressed by the user, setting keys and messages necessary for using the copy job are displayed on the liquid crystal display portion 11. When the transmission key 15 is pressed by the user, setting keys and messages necessary for using the scanner and facsimile jobs are displayed on the liquid crystal display portion 11. When the box key 16 is pressed by the user, setting keys and messages necessary for using a box job are displayed on the liquid crystal display portion 11. Note that the box job means a job for storing image data or the like in a predetermined storage region called a box (for example, a folder provided to a storage portion 113 described later).

With reference to FIG. 1 again, the image reading portion 102 reads a document so as to form image data of the document. Although not illustrated, the image reading portion 102 includes optical system members such as an exposure lamp, a mirror, lens, and an image sensor. This image reading portion 102 generates image data when a beam irradiates the document placed on a contact glass 21 and an output value of each pixel of the image sensor that has received a beam reflected from the document is A/D converted. Thus, printing can be performed based on the image data obtained by reading the document with the image reading portion 102 (copy job). In addition, it is also possible to store the image data obtained by reading the document with the image reading portion 102 (scanner job). Note that when the image reading portion 102 reads the document, the document placed on the contact glass 21 can be pressed down by a document cover 22.

The paper sheet feeder 103 includes a plurality of cassettes 31 for storing paper sheets P as recording media. The paper sheets P stored in the cassettes 31 are fed to the transport path 104. In addition, the paper sheet feeder 103 includes a pickup roller 32 for drawing out the stored paper sheet P, a pair of separation rollers 33 to suppress double feeding of paper sheets P, and the like.

The transport path 104 is used for transporting the paper sheet P in the apparatus. Specifically, the paper sheet P fed from the paper sheet feeder 103 is transported in the transport path 104 so as to pass the intermediate transfer portion 106 and the fixing portion 107 in this order, and is led to a delivery tray 109. This transport path 104 includes a registration roller pair 41 or the like, which keeps the paper sheet P to wait before the intermediate transfer portion 106 and sends out the same to the intermediate transfer portion 106 in synchronization with timing.

The image forming portion 105 forms a toner image based on the image data, and includes four color image forming portions 50 (an image forming portion 50Bk for forming a black toner image, an image forming portion 50Y for forming a yellow toner image, an image forming portion 50C for forming a cyan toner image, and an image forming portion 50M for forming a magenta toner image), and an exposing device 5. Note that the image forming portions 50Bk, 50Y, 50C, and 50M form toner images having different colors, but have basically the same structure. Therefore, in the following description, the symbols indicating the colors (Bk, Y, C, and M) are omitted.

Figure 3:
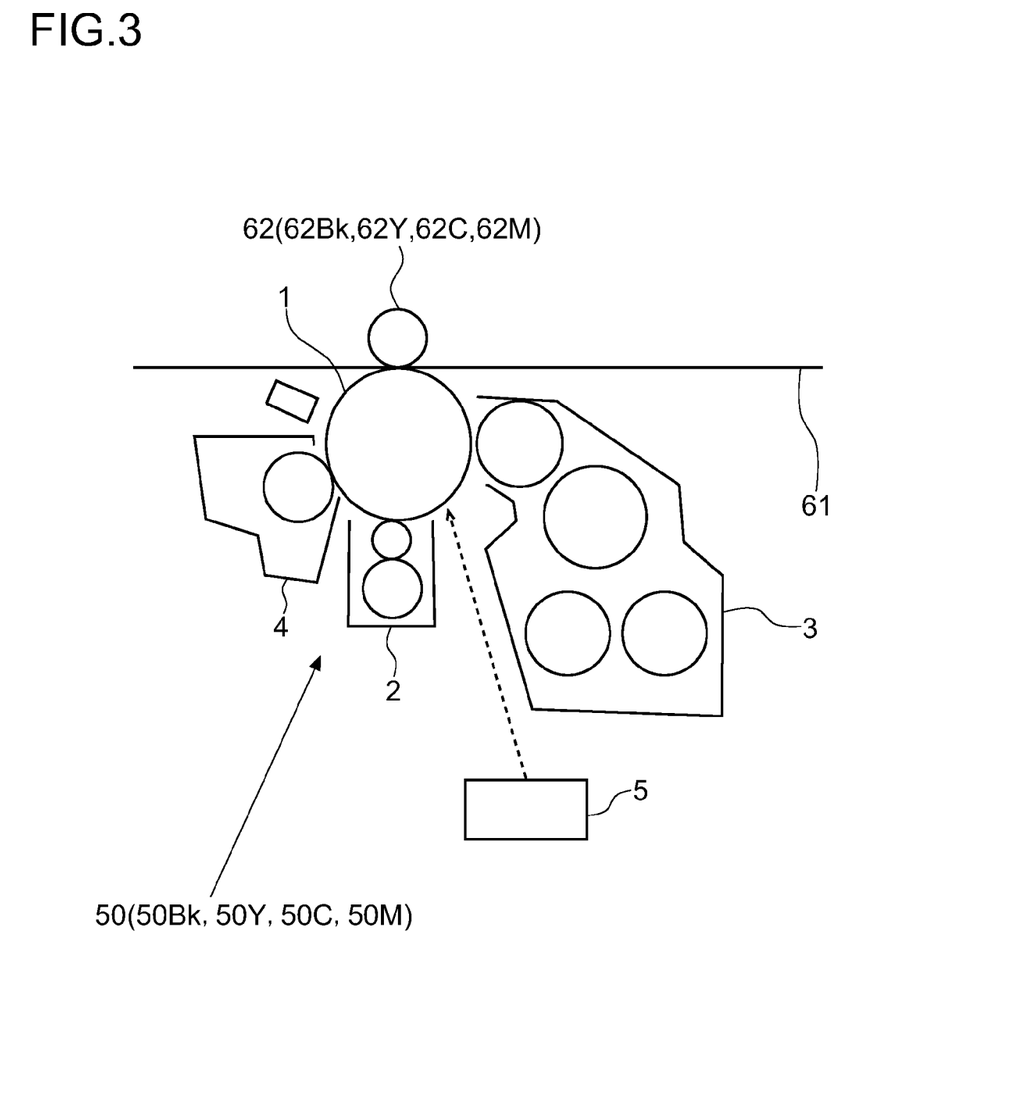
FIG. 3 is a schematic diagram illustrating an image forming portion of the image forming apparatus illustrated in FIG. 1.

Each of the image forming portions 50 includes a photosensitive drum 1, a charging device 2, a developing device 3, and a cleaning device 4 as illustrated in FIG. 3.

Each photosensitive drum 1 carries the toner image on its outer circumferential surface having a photosensitive layer, and is supported in a rotatable manner in the circumferential direction. Each charging device 2 charges the corresponding photosensitive drum 1 at a certain potential. Each developing device 3 stores developing agent of the corresponding color and supplies the toner to the corresponding photosensitive drum 1. Each cleaning device 4 cleans the corresponding photosensitive drum 1. Further, the outer circumferential surface of each photosensitive drum 1 is exposed by the exposing device 5. Thus, an electrostatic latent image is formed on the outer circumferential surface of each photosensitive drum 1.

Although not illustrated, the exposing device 5 includes a semiconductor laser element, a polygon mirror, a polygon motor, an Fθ lens, a reflection mirror, and the like. Note that a set of these elements of the exposing device 5 may be disposed for each color image forming portion 50. Alternatively, only the semiconductor laser element, the Fθ lens, and the reflection mirror are disposed as one set for each color image forming portion 50, and the polygon mirror and the polygon motor may be shared by two color (or four color) image forming portions 50.

With reference to FIG. 1 again, the intermediate transfer portion 106 undergoes primary transfer of the toner image from the image forming portion 105 and then performs secondary transfer to the paper sheet P. The intermediate transfer portion 106 includes at least an intermediate transfer belt 61, and primary transfer rollers 62Bk, 62Y, 62C, and 62M assigned to the image forming portions 50, respectively. Each of the primary transfer rollers 62Bk, 62Y, 62C, and 62M and the corresponding image forming portion 50 (specifically, the photosensitive drum 1) sandwich the intermediate transfer belt 61, and a voltage for transfer (transfer bias) is applied to each of the primary transfer rollers 62Bk, 62Y, 62C, and 62M.

In addition, the intermediate transfer portion 106 also includes a drive roller 63 and following rollers 64. Further, the intermediate transfer belt 61 is stretched around the drive roller 63 and the following rollers 64 as well as the primary transfer rollers 62Bk, 62Y, 62C, and 62M. Therefore, when the drive roller 63 is driven to rotate, the intermediate transfer belt 61 moves in a circulating manner.

Further, the intermediate transfer portion 106 also includes secondary transfer roller 65. This secondary transfer roller 65 and the drive roller 63 sandwich the intermediate transfer belt 61, and the voltage for transfer (transfer bias) is applied to the secondary transfer roller 65.

Then, the toner images formed in the image forming portions 50 are sequentially overlaid without misregistration as the primary transfer onto the intermediate transfer belt 61, by the primary transfer rollers 62Bk, 62Y, 62C, and 62M, to each of which the voltage for transfer is applied. In other words, a full color toner image is transferred to the intermediate transfer belt 61. After that, the toner image primarily transferred to the intermediate transfer belt 61 is secondarily transferred to the paper sheet P by the secondary transfer roller 65 to which the voltage for transfer is applied.

In addition, the intermediate transfer portion 106 also includes a belt cleaning device 66. Then, the belt cleaning device 66 cleans the intermediate transfer belt 61 after the secondary transfer of the toner image from the intermediate transfer belt 61 to the paper sheet P.

The fixing portion 107 heats and presses the toner image secondarily transferred onto the paper sheet P so as to be fixed. This fixing portion 107 includes a fixing roller 71 in which a heat source is embedded, and a pressing roller 72 that is pressed to the fixing roller 71. Then, the paper sheet P onto which the toner image is secondarily transferred passes between the fixing roller 71 and the pressing roller 72 so as to be heated and pressed. Thus, the toner image is fixed onto the paper sheet P.

Then, after passing through the fixing portion 107, the paper sheet P is delivered to the delivery tray 109. Thus, the image forming process is completed.

In addition, the double-sided transport path 108 enables double-sided printing. This double-sided transport path 108 branches from the transport path 104 on the downstream side of the fixing roller 71 and the pressing roller 72, and joins the transport path 104 on the upstream side of the registration roller pair 41. Further, the double-sided transport path 108 includes a switching nail 81 disposed at the branch point from the transport path 104, a delivery roller pair 82 that is disposed at a delivery outlet 109a connected to the delivery tray 109 and is capable of switching between forward and backward rotation directions, a conveying roller pair 83 for conveying the paper sheet P, and the like.

When the double-sided printing is performed, the switching nail 81 becomes a position for closing the double-sided transport path 108, so as to guide the paper sheet P sent from the fixing portion 107 to the delivery tray 109. In addition, the delivery roller pair 82 first rotates in the forward direction so that the paper sheet P is partially delivered onto the delivery tray 109. After that, the delivery roller pair 82 rotates in the backward direction before the paper sheet P completely passes through the delivery roller pair 82. In this case, the switching nail 81 swings in the direction for opening the double-sided transport path 108. Thus, the one-side printed paper sheet P is guided to the double-sided transport path 108.

The paper sheet P guided to the double-sided transport path 108 is conveyed by the conveying roller pair 83 so as to reach the upstream side of the registration roller pair 41. Then, the paper sheet P is conveyed from the intermediate transfer portion 106 to the fixing portion 107 again. In this case, because the front and back sides of the paper sheet P are reversed, the secondary transferring process and the fixing process are performed on the back side (unprinted side) of the paper sheet P. Then, the paper sheet P after finishing the double-sided printing is delivered onto the delivery tray 109.

Figure 4:
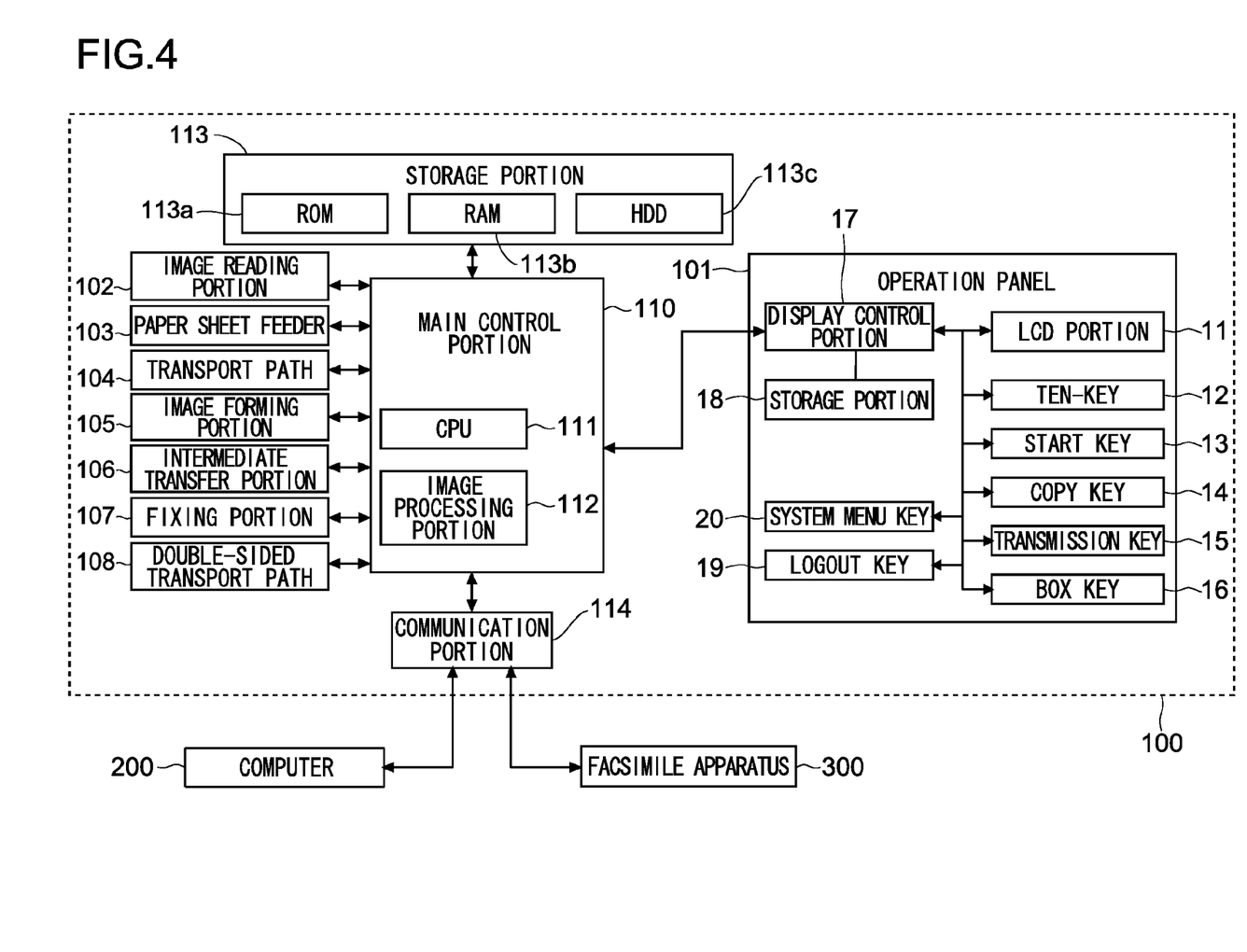
FIG. 4 is a block diagram illustrating a hardware structure of the image forming apparatus illustrated in FIG. 1.

Next, with respect to FIG. 4, a hardware structure of the image forming apparatus 100 is described.

The image forming apparatus 100 includes a main control portion 110. This main control portion 110 includes a CPU 111 as a central processing unit and an image processing portion 112. In addition, the main control portion 110 is connected to the operation panel 101, the image reading portion 102, and the engine portion (the paper sheet feeder 103, the transport path 104, the image forming portion 105, the intermediate transfer portion 106, the fixing portion 107, and the double-sided transport path 108), and the like. Then, the main control portion 110 performs control of the individual portions and calculations based on various programs and data stored in the storage portion 113. Note that the main control portion 110 may be split into a main control portion for general control and image processing, and an engine control portion for controlling image formation and turning on and off motors for rotating the various rotating members.

The storage portion 113 includes a volatile storage device and a nonvolatile storage device, such as a ROM 113a, RAM 113b, and HDD 113c. Then, the various programs and data stored in the storage portion 113 are stored in the ROM 113a and are extended to the RAM 113b.

As the programs stored in the storage portion 113, there are a plurality of application programs for performing a plurality of types of jobs, respectively. For instance, there are a copying application for performing the copying job, a printing application for performing the printing job, a scanner application for performing the scanner job, a facsimile application for performing the facsimile job, and a box application for performing the box job. Note that over various applications may be stored in addition to the above-mentioned applications corresponding to the basic jobs.

In addition, the main control portion 110 is connected to a communication portion 114. The communication portion 114 is connected to an external computer 200, for example, via a network (or a cable) so as to communicate with the same. Thus, the printing can be performed based on image data transmitted from the computer 200 (printing job). Further, the image data obtained by reading the document with the image reading portion 102 can also be transmitted to the computer 200 (scanner job). Further, for example, the communication portion 114 may includes a modem or the like. In this case, facsimile communication with an external facsimile apparatus 300 can be performed via a network such as a telephone line (facsimile job).

The operation panel 101 connected to the main control portion 110 includes a display control portion 17. The display control portion 17 includes a CPU and ICs, and controls displaying operation of the liquid crystal display portion 11. In addition, when the user presses a software key displayed on the liquid crystal display portion 11 (touch panel), the display control portion 17 receives an output of the touch panel so as to locate coordinates of the pressed position. Thus, the position pressed by the user on the liquid crystal display portion 11 (a selected software key) is specified. For instance, data such as a table showing correspondence between the touch panel output and the coordinates of the pressed position is stored in the storage portion 18 (or the storage portion 113).

For instance, when the user presses the copy key 14, the display control portion 17 controls the liquid crystal display portion 11 to display a setting screen for accepting setting instructions about the copying job (a screen on which setting keys as software keys and messages are arranged). When the user presses a setting key displayed on the liquid crystal display portion 11, the display control portion 17 detects the setting key pressed by the user, and a result of detection is output to the main control portion 110. Thus, a set content about copying job is changed and set.

Note that operation screen data for displaying various operation screens including the setting screen on the liquid crystal display portion 11 is stored in the storage portion 18, for example. Then, the display control portion 17 reads data corresponding to the operation screen to be displayed on the liquid crystal display portion 11 from the storage portion 18, based on the operation performed by the user on the operation panel 101, and controls the liquid crystal display portion 11 to display an appropriate operation screen.

Then, after accepting the setting instruction of the job to be performed from the user, the display control portion 17 controls the liquid crystal display portion 11 to display the start key as the software key. Thus, the user can start execution of the job by pressing the start key displayed on the liquid crystal display portion 11. Alternatively, when the start key 13 as the hardware key is pressed by the user, the execution of the job is also started.

Figure 5:
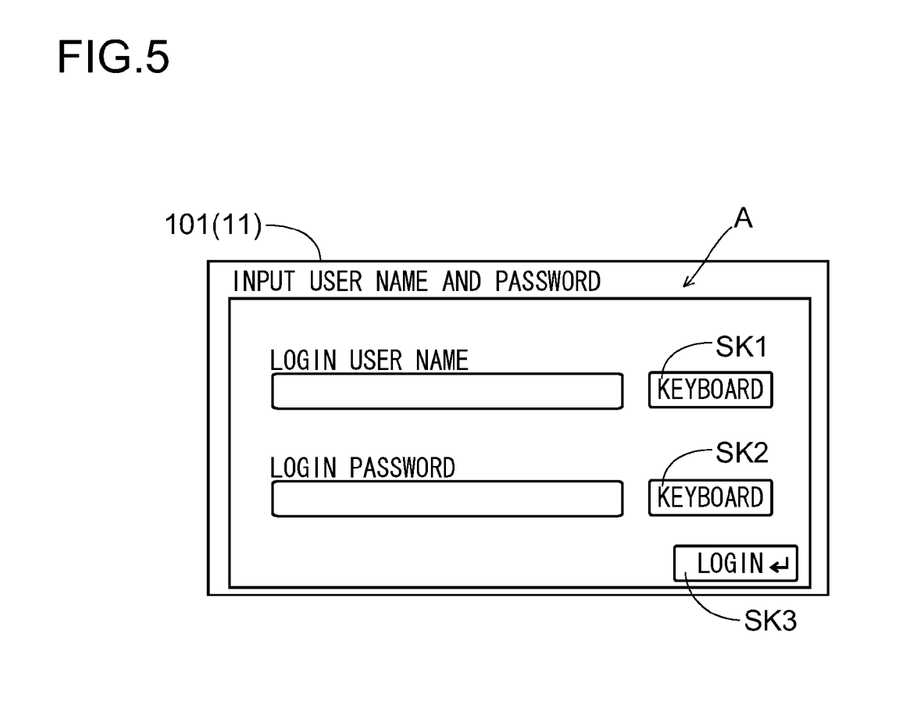
FIG. 5 is a diagram illustrating an example of a screen displayed on the operation panel illustrated in FIG. 2 (a diagram of a user authentication screen).

In addition, the operation panel 101 accepts input operation of the user authentication for login (input operation of a login user name and a login password) from the user. For instance, when accepting the input operation of user authentication for login from the user, the liquid crystal display portion 11 displays a user authentication screen A (a screen for accepting input operation of a login user name and a login password from the user) as illustrated in FIG. 5.

The user authentication screen A includes software keys SK1 and SK2 named "KEYBOARD". When the software key SK1 is pressed by the user, the liquid crystal display portion 11 displays a keyboard screen for accepting input operation of a login user name from the user (a screen with a software keyboard). When software key SK2 is pressed by the user, a keyboard screen for accepting an input operation of a login password from the user is displayed. Thus, the user can input the login user name and the login password using the software keyboard. Note that details of the keyboard screens will be described later.

Then, after finishing input of the login user name and the login password, the user presses a software key SK3 named "LOGIN" on the user authentication screen A. When the software key SK3 is pressed by the user, the display control portion 17 (or the main control portion 110) decides whether or not the user information input on the user authentication screen A (the login user name and the login password) are user information that can be authenticated. For instance, the display control portion 17 decides whether or not the user information input on the user authentication screen A matches with user information registered in advance. If they match with each other, the login is allowed. The user information as a basis of authentication decision by the display control portion 17 is registered by the user in advance and is stored in the storage portion 113 or the like.

Note that when the user logs out, the user presses a logout key 19 disposed on the operation panel 101 (see FIG. 2).

Figure 6:
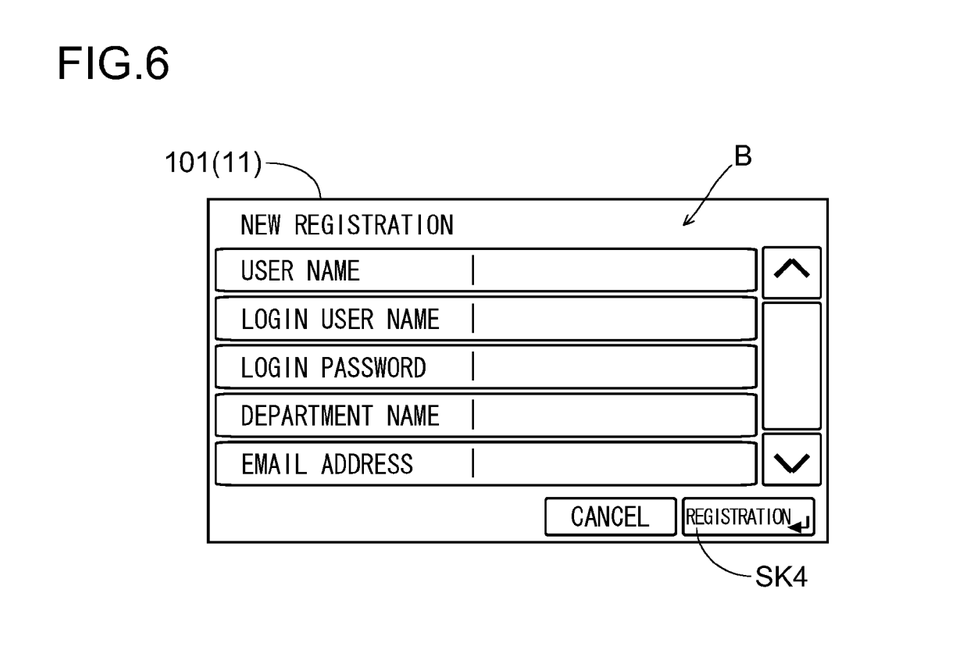
FIG. 6 is a diagram illustrating an example of a screen displayed on the operation panel illustrated in FIG. 2 (a diagram of a user registration screen).

In addition, for example, the user presses a system menu key 20 disposed on the operation panel 101 (see FIG. 2) for registering his or her user information (for user registration). When the system menu key 20 is pressed by the user, the liquid crystal display portion 11 displays a list of various setting items including the user registration. When the user selects (presses) the user registration, the liquid crystal display portion 11 displays a user registration screen B as illustrated in FIG. 6. Then, the user performs the user registration by input operation on the user registration screen B.

As items that can be registered in this case, there are a user name, a login user name, a login password, a department name, an email address, and the like. For registering these items, the user opens a keyboard screen (a screen on which software keyboards are disposed). For instance, when the user presses (selects) USER NAME, the liquid crystal display portion 11 displays a keyboard screen for accepting user name registration (input operation). Then, the user inputs the user name using the software keyboard. Note that the same is true for other items than USER NAME.

Then, the user presses a software key SK4 named "REGISTRATION" after inputting the items. Thus, user information input by the user is stored in the storage portion 113, and the user registration is completed.

Here, the liquid crystal display portion 11 selectively displays one of a plurality of keyboard screens (screens with software keyboards) having different character types that can be input, in accordance with a user's instruction. Thus, the user can input a character string indicating the user information using a desired character type. Note that screen information for displaying a plurality of keyboard screens on the liquid crystal display portion 11 is stored in the storage portion 113 or the like.

For instance, it is supposed that the user presses (selects) the USER NAME item on the user registration screen B. In this case, the liquid crystal display portion 11 displays a keyboard screen that is selected as an initial screen for accepting input of the user name from the plurality of keyboard screens stored in the storage portion 113. Note that the keyboard screen that is set in advance as the initial screen for accepting input of the user name is a keyboard screen KB as illustrated in FIG. 7.

Figure 7:
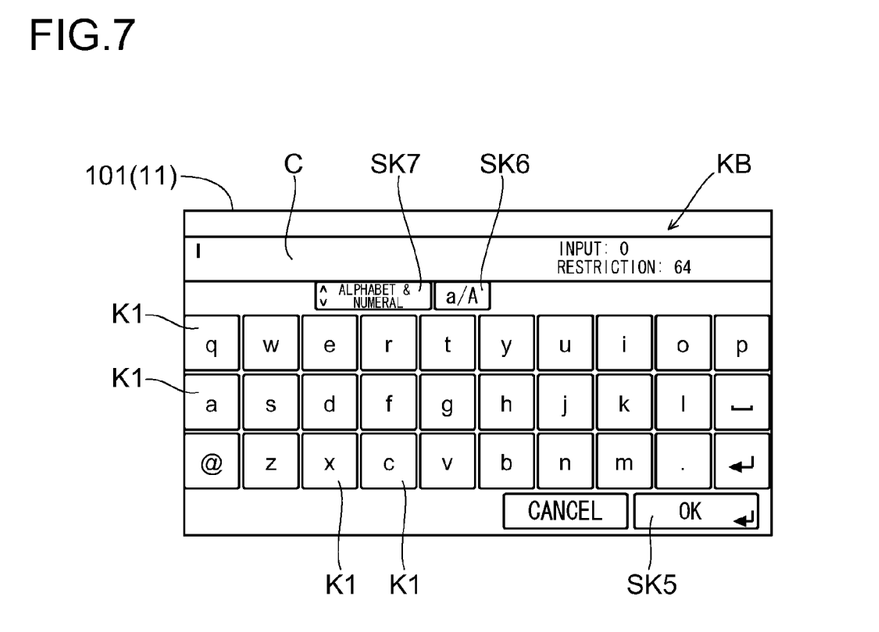
FIG. 7 is a diagram illustrating an example of a screen displayed on the operation panel illustrated in FIG. 2 (a diagram of a keyboard screen for inputting lower case alphabets).

On the keyboard screen KB illustrated in FIG. 7, there are disposed a plurality of character input keys K1 for mainly inputting lower case alphabets. When this keyboard screen KB is displayed on the liquid crystal display portion 11, the user can input the character string using lower case alphabets. In other words, the user can register the character string using lower case alphabets as the user name.

For instance, when the user inputs a character string on the keyboard screen KB illustrated in FIG. 7, the character string is displayed in an input field C. Next, the user presses a confirming key SK5 (OK key), and the input of the user name is finished. In other words, the user name input on the keyboard screen KB of FIG. 7 is displayed as the USER NAME item on the user registration screen B of FIG. 6.

Figure 8:
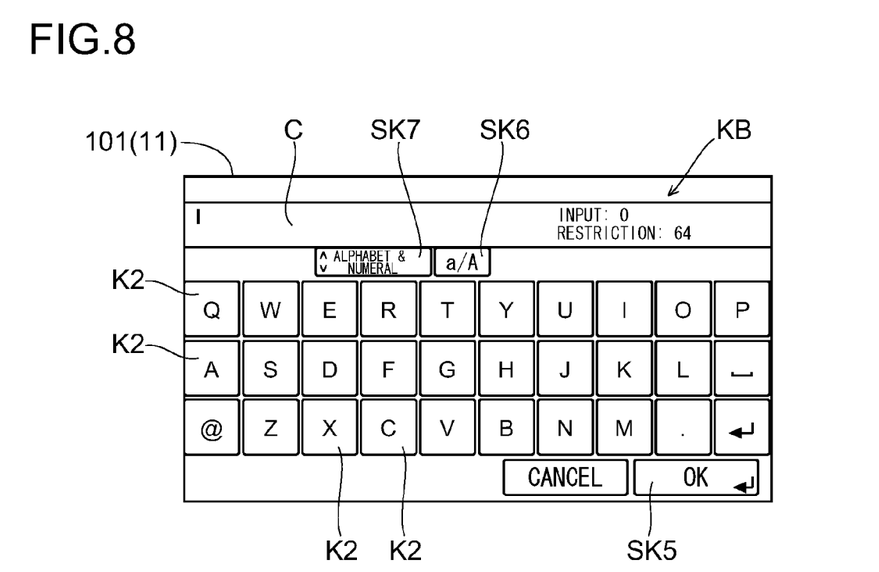
FIG. 8 is a diagram illustrating an example of a screen displayed on the operation panel illustrated in FIG. 2 (a diagram of a keyboard screen for inputting upper case alphabets).

However, there is a case where the user wants to use not only lower case alphabets but also upper case alphabets to constitute the character string to be registered as the user name. For this purpose, the keyboard screen KB includes a switching key SK6 for switching the acceptable character type from lower case characters to upper case characters (or from upper case characters to lower case characters). When the user presses the switching key SK6, a keyboard screen KB as illustrated in FIG. 8 is displayed on the liquid crystal display portion 11. The keyboard screen KB of FIG. 8 includes a plurality of character input keys K2 for mainly inputting upper case alphabets. Thus, the user can input upper case alphabets.

Figure 9:
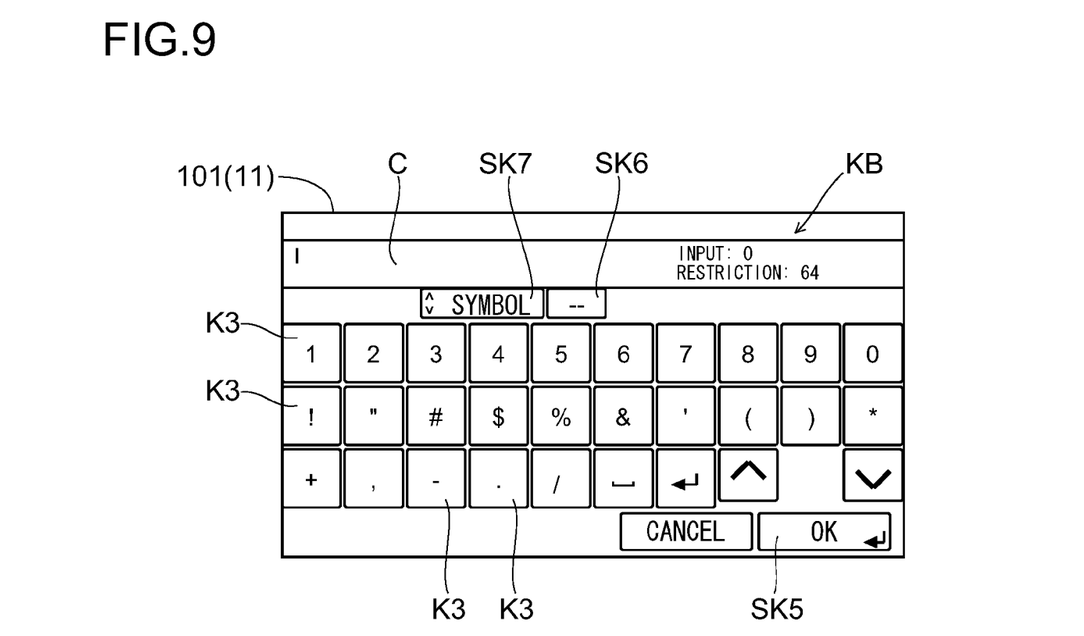
FIG. 9 is a diagram illustrating an example of a screen displayed on the operation panel illustrated in FIG. 2 (a diagram of a keyboard screen for inputting numerals and symbols).
Figure 10:
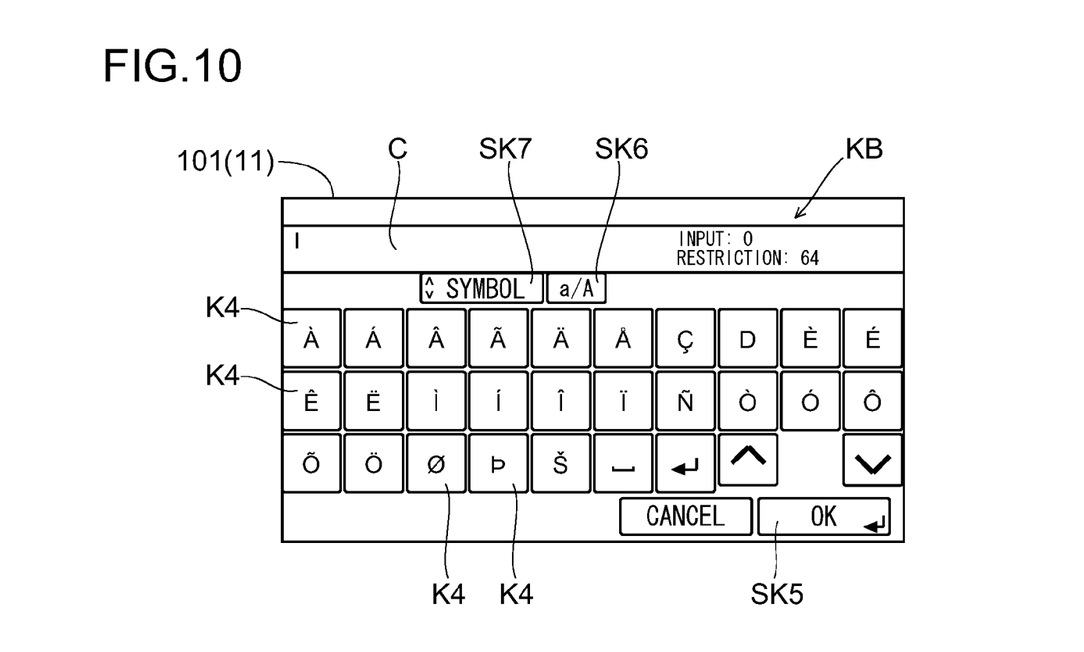
FIG. 10 is a diagram illustrating an example of a screen displayed on the operation panel illustrated in FIG. 2 (a diagram of a keyboard screen for inputting characters with diacritical marks).
Figure 11:
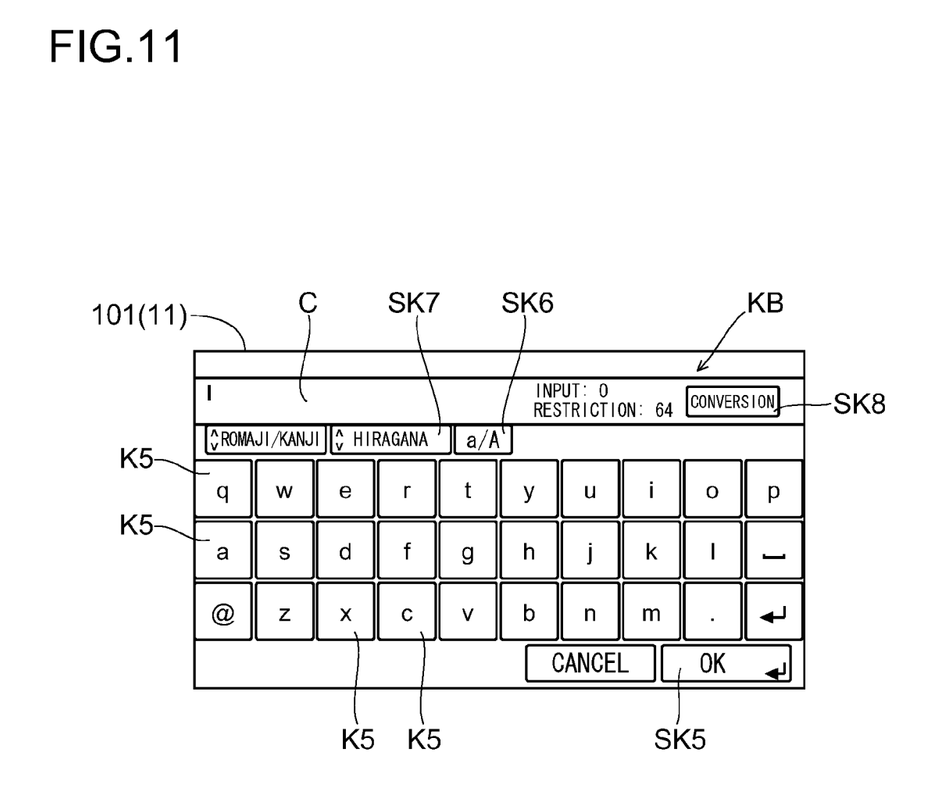
FIG. 11 is a diagram illustrating an example of a screen displayed on the operation panel illustrated in FIG. 2 (a diagram of a keyboard screen for inputting Japanese language).

In addition, the keyboard screen KB includes another switching key SK7 in addition to the switching key SK6. When the user presses this switching key SK7, keyboard screens KB as illustrated in FIGS. 9 to 11 are displayed on the liquid crystal display portion 11. For instance, every time when the switching key SK7 is pressed by the user, the keyboard screen KB displayed on the liquid crystal display portion 11 is switched in the order of FIG. 7 (FIG. 8), FIG. 9, FIG. 10, and FIG. 11. When the switching key SK7 on the keyboard screen KB of FIG. 11 is pressed by the user, the keyboard screen KB returns to that of FIG. 7 (FIG. 8).

The keyboard screen KB of FIG. 9 includes a plurality of character input keys K3 for mainly inputting numerals and symbols. Thus, the user can input numerals and symbols.

The keyboard screen KB of FIG. 10 includes a plurality of character input keys K4 for mainly inputting characters with diacritical marks (for example, umlaut symbols). Thus, the user can input characters with diacritical marks. Note that the characters with diacritical marks are often used in German language area, French language area, and the like.

The keyboard screen KB of FIG. 11 includes a plurality of character input keys K5 for inputting alphabets similarly to the keyboard screen KB of FIG. 7 (FIG. 8). However, the keyboard screen KB of FIG. 11 supports Romaji-kana conversion method unlike the keyboard screen KB of FIG. 7 (FIG. 8). In other words, when the user inputs "Kyouto", a character string of corresponding Japanese language (Hiragana) is displayed in the input field C, and further a conversion key SK8 is displayed. Further, when the user presses the conversion key SK8, the Japanese language (Hiragana) in the input field C is converted into Kanji or Katakana. In this case, a list of a plurality of conversion candidates is displayed, and the user can select one of the candidates in the list as a desired conversion candidate.

In this way, when the user inputs the user name on the user registration screen B of FIG. 6, the keyboard screen KB corresponding to a desired character type is displayed on the liquid crystal display portion 11 so that the use can input with the keyboard screen KB. Thus, the user can register a character string using various character types as the user name.

In addition, also in a case where other item than USER NAME is pressed (selected) by the user on the user registration screen B of FIG. 6, the liquid crystal display portion 11 displays the keyboard screen KB that is set in advance as the initial screen for accepting input. Note that usually for other item than USER NAME too, the keyboard screen KB of FIG. 7 (the screen with a plurality of character input keys K1 for mainly inputting lower case alphabets) is set as the initial screen for accepting input in many cases.

Note that in the user authentication screen A of FIG. 5, when the software keys SK1 and SK2 are pressed by the user too, the liquid crystal display portion 11 displays the keyboard screen KB of FIG. 7 as the initial screen.

Here, the user may re-input the user information by opening the keyboard screen KB (screen with software keyboards) and using the software keyboard even in the login state. For instance, when registering the user's address book or when searching for the user's address book among a plurality of address books, the user may re-input the user information (user name and password). In addition, when transmitting certain data to an external apparatus (such as a server), re-input of user information (user name and password) may be requested depending on the transmission destination.

In this case, if the initial screen for accepting input of the user information is default setting, the following inconvenience may occur.

For instance, it is supposed that a user who has registered a user name in Japanese language is logged in, and the user who logged in (hereinafter referred to simply as a logged-in user) is performing a certain operation, when re-input of the user name is requested. In this case, the logged-in user opens the keyboard screen KB (screen with software keyboards) and inputs the user name. However, what is set as the initial screen for accepting input of the user name is the keyboard screen KB for mainly inputting lower case alphabets (see FIG. 7). Therefore, in order to input the user name in Japanese language, the logged-in user must open the keyboard screen KB supporting the Romaji-kana conversion method (see FIG. 11) by pressing the switching key SK7 one or more times. In other words, because the logged-in user is required to perform troublesome operation (of pressing the switching key SK7 one or more times), user's convenience is lowered.

Therefore, in this embodiment, when accepting the logged-in user's re-input of the same user information as the registered user information, the initial screen for accepting re-input is changed in accordance with a character type of the first character of the registered user information that is the same as the user information for which the re-input is to be accepted. Specifically, when the display control portion 17 accepts the re-input of the same user information as the registered user information from the logged-in user, the registered user information that is the same as the user information for which the re-input is to be accepted is referred to, and the character type of the first character of the registered user information is determined Then, the liquid crystal display portion 11 displays the keyboard screen KB corresponding to the character type determined by the display control portion 17 as the initial screen for accepting the re-input.

For instance, it is supposed that the logged-in user has registered his or her user name in Japanese language. In other words, it is supposed that all the characters included in the registered user name of the logged-in user are Japanese characters. In this case, the display control portion 17 determines that the character type of the first character of the registered user name of the logged-in user is Japanese language. Therefore, the liquid crystal display portion 11 displays the keyboard screen KB supporting the Romaji-kana conversion method (see FIG. 11) as the initial screen for accepting re-input. Thus, the logged-in user is not required to switch the keyboard screen KB for performing re-input of the user name.

In addition, as another example, the registered user name of the logged-in user may include a plurality of character types. For instance, in many cases, the first character of the user name is the upper case alphabet and the second and following characters are lower case alphabets. In this case, because the character type of the first character of the registered user name of the logged-in user is the upper case alphabet, the initial screen for accepting re-input of the user name is the keyboard screen KB for mainly inputting upper case alphabets (see FIG. 8). Therefore, when performing re-input of the user name, the logged-in user is not required to switch the keyboard screen KB at least for inputting the first character. However, the keyboard screen KB must be switched for inputting the second and following characters.

Note that the USER NAME among a plurality of items included in the user information is described above. Also for other items than USER NAME (such as login user name, login password, department name, and email address), when re-input of the same user information as the registered user information is accepted, the liquid crystal display portion 11 displays the keyboard screen KB corresponding to the character type of the first character of the registered user information as the initial screen for accepting the re-input.

Hereinafter, with reference to a flowchart of FIG. 12, an action when the re-input of the user information is accepted from the logged-in user is described.

Figure 12:
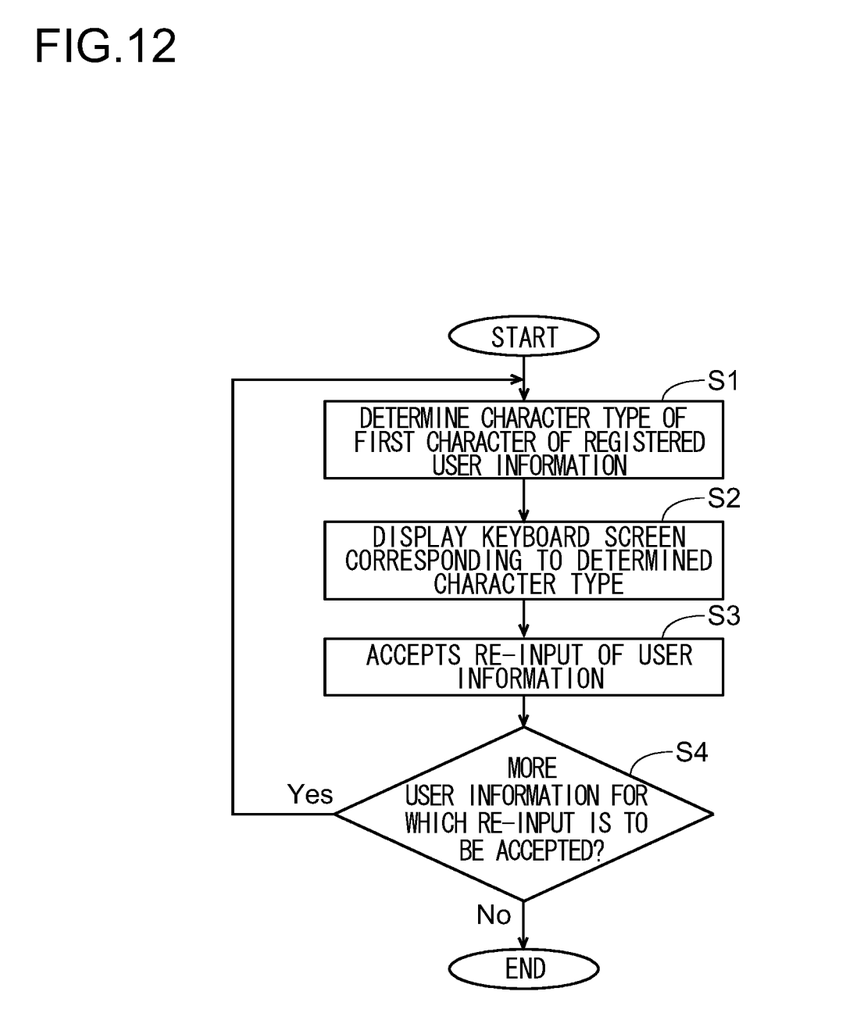
FIG. 12 is a flowchart illustrating an action of the operation panel illustrated in FIG. 2 (an action when accepting re-input of user information from a logged-in user).

First, it is supposed that a predetermined user has already finished the user registration when the flow of FIG. 12 starts. In other words, it is supposed that the user information (such as user name, login user name, login password, department name, and email address) of the predetermined user is stored in the storage portion 113. Then, the flow of FIG. 12 starts after the predetermined user logs in when the re-input of the user information is accepted from the logged-in user (the predetermined user who logged in).

In Step S1, the display control portion 17 refers to the registered user information that is the same as the user information for which the re-input is to be accepted (user information stored in the storage portion 113), so as to determine a character type of the first character of the registered user information.

For instance, when the re-input of the user name is to be accept, the display control portion 17 determines a character type of the first character of the same registered user name as the user name for which the re-input is to be accepted (user name of the logged-in user).

In Step S2, the liquid crystal display portion 11 displays the keyboard screen KB corresponding to the character type determined by the display control portion 17 as the initial screen for accepting re-input.

For instance, it is supposed that the character string of the registered user name is "kyoto". In this case, the liquid crystal display portion 11 displays the keyboard screen KB corresponding to lower case alphabets (see FIG. 7) as the initial screen for accepting the re-input. In other words, setting of the initial screen for accepting re-input of the user name is left to be default.

In addition, for example, it is supposed that the character string of the registered user name is "Kyoto". In this case, the liquid crystal display portion 11 displays the keyboard screen KB corresponding to upper case alphabets (see FIG. 8) as the initial screen for accepting re-input.

In addition, for example, it is supposed that the character string of the registered user name is "0123". In this case, the liquid crystal display portion 11 displays the keyboard screen KB corresponding to numerals and symbols (see FIG. 9) as the initial screen for accepting the re-input.

In addition, for example, it is supposed that the first character of the registered user name is a character with a diacritical mark. In this case, the liquid crystal display portion 11 displays the keyboard screen KB corresponding to characters with diacritical marks (see FIG. 10) as the initial screen for accepting the re-input.

In addition, for example, it is supposed that the character string of the registered user name is in Japanese language. In this case, the liquid crystal display portion 11 displays the keyboard screen KB supporting the Romaji-kana conversion method (see FIG. 11) as the initial screen for accepting the re-input.

Then, in Step S3, the liquid crystal display portion 11 accepts re-input of the user information. In other words, the user presses the confirming key SK5 after re-input of the user information in the input field C of the keyboard screen KB.

Note that when the character string of "kyoto" is registered as the user name, for example, the user can finish the input of user name without switching the keyboard screen KB. However, when the character string of "Kyoto" is registered as the user name, the user inputs the first character "K" and then presses the switching key SK6 of the keyboard screen KB so as to switch the keyboard screen KB corresponding to upper case alphabets (see FIG. 8) to the keyboard screen KB corresponding to lower case alphabets (see FIG. 7).

After going from Step S3 to Step S4, the display control portion 17 decides whether or not there is user information for which re-input is to be accepted successively. If there is no user information for which re-input is to be accepted successively, accept of the re-input of user information is finished.

On the other hand, in Step S4, if there is user information for which re-input is to be accepted successively, the process of Steps S1 to S4 is repeated until there is no user information for which re-input is to be accepted.

For instance, it is supposed that the user information includes a plurality of items (user name, login user name, login password, department name, and email address), and the re-input is accepted successively for the plurality of items. In this case, the liquid crystal display portion 11 switches the initial screen for accepting re-input to the keyboard screen KB corresponding to a character type of the first character of the same registered item as the item for which re-input is to be accepted currently, every time when re-input of each of the plurality of items is accepted. In other words, even if the initial screen for accepting re-input of the user name is the keyboard screen KB supporting the Romaji-kana conversion method (see FIG. 11), the initial screen for accepting re-input of the login user name may be the keyboard screen KB corresponding to lower case alphabets (see FIG. 7).

In this embodiment, as described above, when the re-input of the same user information as the registered user information is accepted, the liquid crystal display portion 11 displays the keyboard screen KB corresponding to a character type of the first character of the registered user information as the initial screen for accepting the re-input. Thus, when the user performs the re-input of user information, because the keyboard screen KB corresponding to a character type of the first character is displayed as the initial screen on the liquid crystal display portion 11, the user is not required to switch the keyboard screen KB displayed on the liquid crystal display portion 11 at least for inputting the first character. In other words, in this embodiment, when the re-input of user information is accepted, user's operations (for switching the keyboard screen KB displayed on the liquid crystal display portion 11) can be reduced or eliminated. Therefore, user's convenience is improved.

In addition, in this embodiment, as described above, the liquid crystal display portion 11 switches the initial screen for accepting re-input to the keyboard screen KB corresponding to a character type of the first character of the same registered item as the item for which re-input is to be accepted currently, every time when each re-input of the same items as the registered items is accepted. With this structure, even when a plurality of items are included in the user information, and each re-input of the items is accepted from the user, it is possible to reduce or eliminate the user's operations (for switching the keyboard screen KB displayed on the liquid crystal display portion 11).

In addition, in this embodiment, as described above, when re-input of the same user information as the registered user information is accepted after the user logs in, the liquid crystal display portion 11 displays the keyboard screen KB corresponding to a character type of the first character of the registered user information as the initial screen for accepting the re-input. With this structure, the user can reduce operations for re-input of user information only by performing operation for login (by registering the user information in advance), so that good convenience is provided.

The embodiment described here is merely an example in all respects and should not be interpreted as a limitation. The scope of the present disclosure is defined not by the above description of the embodiment but by the claims, and further includes every modification within meanings and ranges equivalent to the claims.

What is claimed is:

1. A character input device comprising:
    an operation display portion for selectively display one of a plurality of keyboard screens having different character types that can be input, and for accepting input of a character string indicating user information;
    a storage portion for storing screen information for displaying the plurality of keyboard screens, and for storing user information for which input is accepted by the operation display portion; and
    a display control portion for controlling display operation of the operation display portion, wherein
    types of character input keys arranged on the plurality of keyboard screens respectively are fixed, and
    when re-input of user information that is same as registered user information already stored in the storage portion is accepted,
    the display control portion determines a character type of a first character of the registered user information that is the same as the user information of which the re-input is being accepted, and
    the operation display portion displays, out of the plurality of keyboard screens, a keyboard screen on which are arranged character input keys that allow input of characters corresponding to the character type determined by the display control portion as an initial screen for accepting re-input.

2. The character input device according to claim 1, wherein the user information includes a plurality of items, and
    the operation display portion switches the initial screen for accepting re-input to the keyboard screen corresponding to a character type of the first character of the same registered item as the item for which re-input is to be accepted currently, every time when each re-input of the same items as the registered items already stored in the storage portion is accepted.

3. The character input device according to claim 1, wherein the user information is information about a user who logs in, and
    the operation display portion displays a keyboard screen corresponding to a character type of the first character of the registered user information as the initial screen for accepting the re-input, when accepting the re-input of the same user information as the registered user information that is already stored in the storage portion, after the user logs in.

4. An image forming apparatus comprising the character input device according to claim 1.

5. The character input device according to claim 1, wherein the display control portion determines whether the character type of the first character of the registered user information that is the same as the user information of which the re-input is being accepted is an upper case alphabet, a lower case alphabet, or a numeral.

6. A method for controlling a character input device, the method comprising the steps of:
    selectively displaying one of a plurality of keyboard screens having different character types that can be input, so as to accept input of a character string indicating user information; and
    storing user information for which input is accepted, wherein
    types of character input keys arranged on the plurality of keyboard screens respectively are fixed,
    when re-input of user information that is same as already stored registered user information is accepted, a character type of a first character of the registered user information that is the same as the user information of which the re-input is being accepted is determined, and, out of the plurality of keyboard screens,
    a keyboard screen on which are arranged character input keys that allow input of characters corresponding to the determined character type is displayed as an initial screen for accepting re-input.

7. The method according to claim 6, wherein
    the user information includes a plurality of items, and
    the initial screen for accepting re-input is switched to the keyboard screen corresponding to a character type of the first character of the same registered item as the item for which re-input is to be accepted currently, every time when each re-input of the same items as the registered items already stored is accepted.

8. The method according to claim 6, wherein
    the user information is information about a user who logs in, and
    a keyboard screen corresponding to a character type of the first character of the registered user information is displayed as the initial screen for accepting the re-input, when accepting the re-input of the same user information as the registered user information that is already stored, after the user logs in.

9. The method according to claim 6, wherein
    the character type of the first character of the registered user information that is the same as the user information of which the re-input is being accepted is determined to be any one of an upper case alphabet, a lower case alphabet, or a numeral.

* * * * *